(12) United States Patent
Lee et al.

(10) Patent No.: US 7,292,784 B2
(45) Date of Patent: **\*Nov. 6, 2007**

(54) HIGH SPEED OPTICAL ROUTING APPARATUS AND METHOD

(75) Inventors: Ki-Cheol Lee, Suwon-shi (KR); Jong-Kwon Kim, Taejonkwangyok-shi (KR); Jun-Ho Koh, Suwon-shi (KR); Sang-Hyun Doh, Hwasong-shi (KR); Se-Kang Park, Songnam-shi (KR)

(73) Assignee: Samsung Electronics Co., Ltd., Yeong Tong-Gu, Suwon-si, Gyeonggi-Do (KR)

( * ) Notice: Subject to any disclaimer, the term of this patent is extended or adjusted under 35 U.S.C. 154(b) by 648 days.

This patent is subject to a terminal disclaimer.

(21) Appl. No.: 10/792,584

(22) Filed: Mar. 3, 2004

(65) Prior Publication Data

US 2004/0223762 A1 Nov. 11, 2004

(30) Foreign Application Priority Data

May 7, 2003 (KR) ...................... 10-2003-0029005

(51) Int. Cl.
*H04J 14/02* (2006.01)
(52) U.S. Cl. ........................... 398/49; 398/51; 398/166
(58) Field of Classification Search ............ 398/48–51, 398/166
See application file for complete search history.

(56) References Cited

U.S. PATENT DOCUMENTS 6,810,211 B1 * 10/2004 Castanon ...................... 398/47

| 2003/0048506 | A1 * | 3/2003 | Handelman | .................. 359/128 |
| 2003/0133641 | A1 * | 7/2003 | Yoo | ............................ 385/14 |
| 2004/0151171 | A1 * | 8/2004 | Lee et al. | .................... 370/380 |

\* cited by examiner

*Primary Examiner*—Leslie Pascal
(74) *Attorney, Agent, or Firm*—Cha & Reiter, LLC

(57) ABSTRACT

A high speed optical routing apparatus and method, in which data traffic, such as an IP packet, an Ethernet frame, etc., is switched in an optical frame unit at a high speed. The apparatus is provided with a plurality of input and output ports, and with one add port for adding data received from a lower IP router, and one drop port for dropping processed data toward the lower IP router. A header wavelength dividing unit extracts the header wavelength signals from among input optical signals inputted through the input ports and the add port. The header wavelength signals contain header information on data wavelength signals contained in the input optical signals. An optical signal inputting section demultiplexes optical signals having the data signals according to the wavelength, and for dividing and inputting the wavelength-based demultiplexed data wavelength signals according to a frame. The data wavelength signals are divided with the header wavelength signals through the header wavelength dividing section, an optical switch for switching the frame-based divided optical signals outputted from the optical signal inputting, an optical signal outputting section for combining the frame-based divided optical signals switched and outputted at the optical switch, for wavelength-multiplexing the combined optical signals into one output optical signal and for outputting the multiplexed output optical signal, a controlling section for controlling the optical signal inputting section, the optical switch and the optical signal outputting section.

18 Claims, 8 Drawing Sheets

HIGH SPEED OPTICAL ROUTING APPARATUS AND METHOD

CLAIM OF PRIORITY

This application claims priority to an application entitled "High Speed Optical Routing Apparatus and Method," filed in the Korean Intellectual Property Office on May 7, 2003 and assigned Serial No. 2003-29005, the contents of which are hereby incorporated by reference.

BACKGROUND OF THE INVENTION

1. Field of the Invention

The present invention relates to the field of routers and Internet data traffic. More particularly, the present invention relates to a high-capacity optical router, in which data traffic, such as an IP packet, an Ethernet frame, etc., is switched in an optical frame unit at a high speed.

2. Description of the Related Art

Recently, there has been a sharp increase in the demand for access to data services, such as Internet, moving picture, video on demand (VOD) etc., both by the public and businesses. A high-capacity data traffic ranging from several hundreds of Gb/s to several Tb/s commonly occurs in the network. In order to ensure the efficient switching and routing of such traffic, a high-capacity router/switch having a capacity ranging from several hundreds of Gb/s to several Tb/s is required.

In the past, the implementation of such a high-capacity IP router was simulated by the connected of tens of low capacity IP routers to each other, so that a high-capacity effect has been obtained. However, this solution has problems in that, because all the IP routers make use of from 50% to 50% of their capacity simply to interconnect with each other. Thus, the prior art multiply-connected routers wastes half or more of its bandwidth becomes. In addition, the number of the IP routers can be abruptly increased depending upon the requested capacity of a simulated high-capacity router. For this reason, the necessity for the router/switch to have a capacity as high as possible has constantly been expressed in order to reduce the number of pieces of equipment.

Conventionally, two methods have been mainly used to implement such a high-capacity router.

FIG. 1 illustrates a first method, which utilizes construction of the conventional all-optical router and shows a how a high-capacity router of the prior art would make such an implementation. According to FIG. 1, optical data are switched through a space switch 14 having on-off gate switches 14-3. When a conflict breaks out between the optical data, the conflict is resolved using a tunable wavelength converter and a fiber delay line buffer. In addition, the optical data are switched using the tunable wavelength converter and a wavelength router such as a N×N AWG (Arrayed Waveguide Grating) or the like, and the conflict between the optical data is resolved through the fiber delay line.

The second method is to implement a high-capacity IP router, to which a high speed interface of 10 Gb/s or more is applied. According to this second method, headers of inputted packets are recognized according to a packet to activate an electrical switch, and thereby packet routing/switching is carried out. A conflict between the packets is resolved through an electrical buffer. To this end, through the use of various kinds of terabit routers, the foregoing type of high-capacity IP router of the prior art has been developed.

In the all-optical router approaching method as in FIG. 1, a fiber delay line is used to resolve the conflict between the optical data, in which the conflict is caused by an absence of an optical memory. However, when a length of the optical data is increased as a switching capacity of the optical router is increased, the fiber delay line may have a length that ranges from tens of km to hundreds of km. This rather large range brings about a problem in that the dimensions of the system, as well as its complexity becomes greatly increased.

Additionally, because the fiber delay line makes use of a time delay effect that an optical signal undergoes a time delay in an optical fiber, it is very difficult to control the system, and a signal level difference between the optical data is generated due to a loss of the optical fiber. In most all-optical router approaching methods, many tunable wavelength converters (TWCs) 12 are used to carry out switching or buffering. Each TWC 12 includes a tunable wavelength laser and a plurality of semiconductor optical amplifiers (SOAs). Therefore, there is a problem in that expensive production costs are generated.

Further, the tunable wavelength laser has a stabilized velocity in a range between several ms and tens of ms. This stabilized velocity is too slow to be suitable for the optical router. The all-optical router has a problem in that it is very difficult to carry-out performance monitoring of signal as well as assist in signal regeneration.

In the prior art shown in FIG. 1, a plurality of optical couplers are used. This high usage of optical coverage introduces the disadvantage that the optical data can be vulnerable to a high path loss. In case of an electrical IP router, the forwarding must be carried out by recognizing packet headers according to inputted packet. However, there is a great restriction on processing speed, processing high speed packets at a transmission speed of 10 Gb/s. Up to now, the interface for 40 Gb/s has not been developed.

To process 64 byte packets having a transmission speed of 10 Gb/s or 40 Gb/s with the use of the present technique, a forwarding speed of 15 Mp/s or 60 Mp/s is needed. Additionally, packets that are added or dropped with respect to a lower router as well as packets passing through must be processed, a processing burden of the router is greatly increased, thus bringing about a waste of a processing capacity.

In the high-capacity IP router, a high speed electrical switch must be used. However, such an electrical switch places restrictions on speed and expansibility. Further, when a high-capacity node requiring a capacity of several Tb/s or more is established, tens of high-capacity routers are needed. As a result, the high-capacity node does not only become still more complicated, but also has greatly increased establishing and working costs.

SUMMARY OF THE INVENTION

Accordingly, the present invention has been made in part to solve the above-mentioned problems occurring in the prior art. It is a first object of the present invention to provide a high speed optical routing apparatus and method, in which data traffic, such as an IP packet or an Ethernet frame etc., is switched in an optical frame unit at a high speed.

It is another object of the present invention to solve problems of a tunable wavelength converter and a fiber delay line buffer, all of which have caused problems in the conventional all-optical router, as well as to facilitate monitoring of a signal performance and signal regeneration.

It is yet another object of the present invention to solve/slow the problems of the operational speed and expansibility of an electrical switch by using instead an optical switch having a switching speed of several ns, unlike a high speed router approaching method.

It is still yet another object of the present invention to solve problems regarding restrictions on forwarding and switching speed of the conventional IP router by converting packets into optical frames having a constant length in an edge traffic aggregator and performing switching.

It is still yet even another object of the present invention to greatly reduce the number of pieces of equipment establishing a node by having a capacity of Tb/s or more as a monolithic structure, thus considerably reducing installing area, establishing costs and working costs of the node. However, in order to establish a node having a capacity of several Tb/s, tens of IP routers have been used in the art.

In order to accomplish these objects, there is provided a high speed optical routing apparatus, which is provided with a plurality of input and output ports. One of the ports is an add port for adding data received from a lower IP router. Another one of the ports is a drop port for dropping processed data toward a lower IP router, comprising: a header wavelength dividing section for extracting header wavelength signals from among input optical signals inputted through the input ports and the add port, the header wavelength signals containing header information on data wavelength signals contained in the input optical signals An optical signal inputting section is used for demultiplexing optical signals comprising the data wavelength signals according to a wavelength and for dividing and inputting the wavelength-based demultiplexed data wavelength signals according to a frame, the data wavelength signals being divided with the header wavelength signals through the header wavelength dividing section; an optical switch for switching the frame-based divided optical signals outputted from the optical signal inputting; an optical signal outputting section for combining the frame-based divided optical signals switched and outputted at the optical switch, for wavelength-multiplexing the combined optical signals into one output optical signal and for outputting the multiplexed output optical signal. A controlling section controls the optical signal inputting section, the optical switch and the optical signal outputting section. A header managing section for receiving the header wavelength signals divided at the header wavelength dividing section and transmits the header information contained in the header wavelength signals to the controlling section so as to control the optical signal inputting section. The optical switch through the controlling section is used for generating new header information on the multiplexed optical signal outputted through the optical signal outputting section to transmit the new header information to a header wavelength coupling section.

The header wavelength coupling section is used for combining the output of the optical signal output from the optical signal outputting section with a corresponding wavelength signal containing the new header information generated at the header managing section. Finally, an edge traffic aggregator is used for converting the adding of IP packets input from the lower IP router into adding optical frames and transmitting the adding optical frames to the add port, and for converting dropping optical frames from the drop port into dropping IP packets for inputting the dropping optical frames into the lower IP router and transmitting the dropping IP packets to the lower IP router.

Further, there is provided a high speed optical routing method, in which an optical router includes a plurality of input and output ports, one port adds data received from a lower IP router, and one port drops processed data toward the lower IP router. The high speed optical routing method comprising the steps of: a) receiving input optical signals through the input ports and the add port, the input optical signals having a plurality of data wavelengths and at least one first header wavelength containing header information on the respective data wavelengths; b) extracting the first header wavelength from the input optical signals; c) demultiplexing the plurality of data wavelengths according to a wavelength, converting the demultiplexed data wavelengths into electrical signals, and dividing the converted electrical signals according to a frame to reconvert the divided electrical signals into optical signals; d) switching the optical signals of step c) according to the header information contained in the first header wavelength; e) converting the optical signals switched in step d) into electrical signals, combining the converted electrical signals according to a frame, reconverting the combined electrical signals into optical signals, and multiplexing the reconverted optical signals according to a wavelength to generate one optical signal; f) generating wavelength-based header information for the optical signals generated in step e) into at least one second header wavelength, combining the generated second header wavelength with the optical signals generated in step e), and transmitting the combined results to a next node through the output ports; and g) transmitting the optical signals generated in step e) to at least one lower interface through the drop port.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
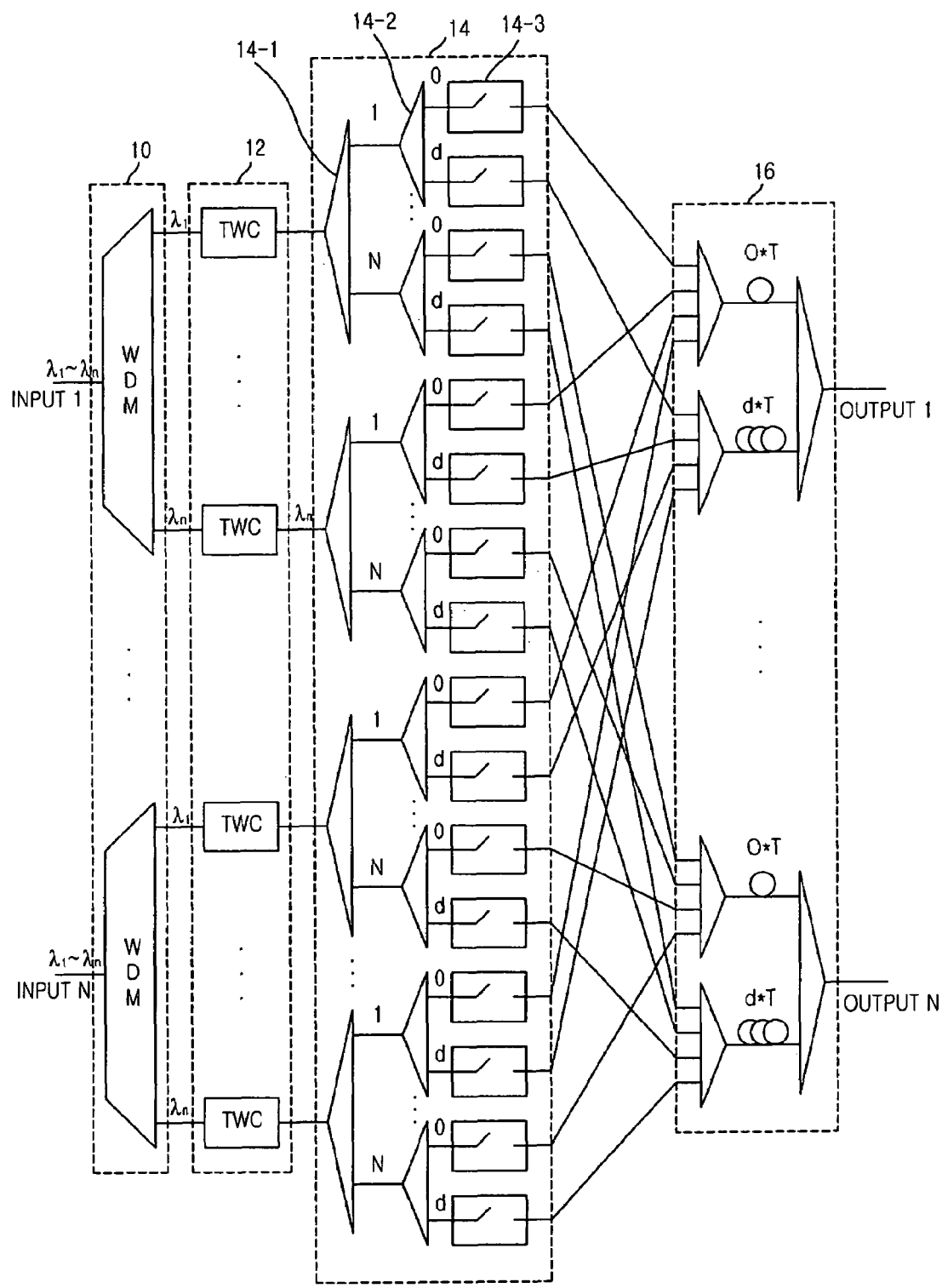
FIG. 1 illustrates a construction of the conventional all-optical router.

Hereinafter, preferred aspects of the present invention will be described in detail with reference to the accompanying drawings. Above all, it should be noted that similar parts are given reference numerals and symbols as similar as possible throughout the drawings. For the purposes of clarity and simplicity, a detailed description of known functions and configurations incorporated herein will be omitted when it may obscure the subject matter of the present invention.

Figure 2:
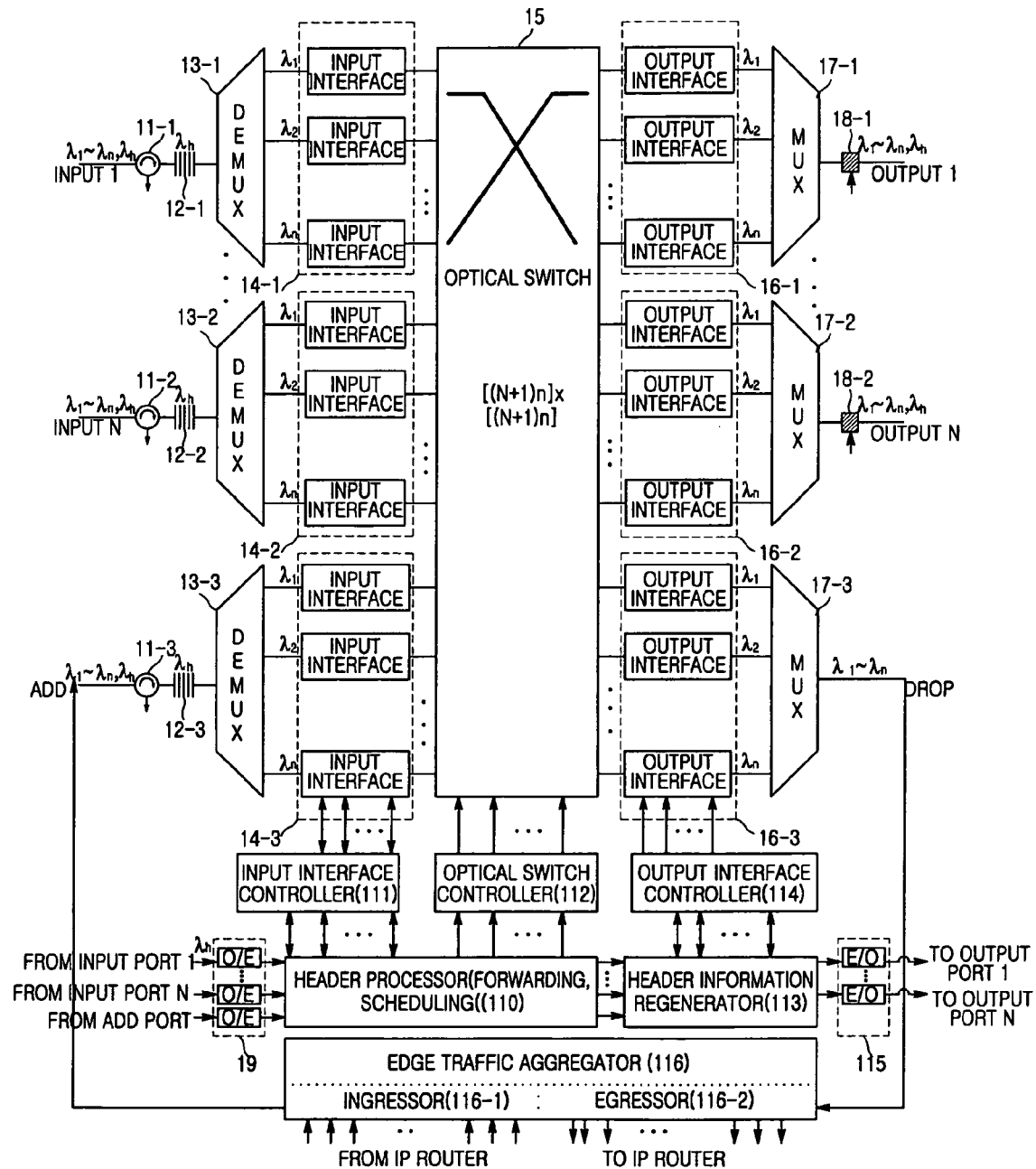
FIG. 2 shows a construction of a high speed optical routing apparatus according to a preferred embodiment of the present invention.

FIG. 2 shows a construction of a high speed optical routing apparatus according to a preferred embodiment of the present invention.

As shown in FIG. 2, the high speed optical routing apparatus according to the present invention includes N-1 pairs of input and output ports and one pair of add and drop ports; optical circulators 11-1 to 11-N and optical fiber gratings 12-1 to 12-N, for detecting header wavelength signals. There are also wavelength division demultiplexers (DEMUXs) 13-1 to 13-N, and input interface sets 14-1 to 14-N for converting inputted optical data frames into electrical signals.

Optical switch 15 is used for switching the optical data fames at a high speed. Output interface sets 16-1 to 16-N are used for processing switched optical data frames. The wavelength division multiplexers (MUXs) 17-1 to 17-N multiplex wavelength-based optical signals, which are outputted through each output interface set into one optical signal. Optical couplers 18-1 and 18-(N-1) combine the headers with the multiplexed one optical signal. An optical/electrical converter set 19 is used for the conversion of the header wavelength signals detected by the optical circulators 11-1 to 11-N into electrical signals. A header processor 110 is used for recognizing header information contained in the header wavelength signals to control the optical routing apparatus. The input and output interface controllers 111 and 114 and an optical switch controller 112 is used for controlling the optical switch. Header information regenerator 113 permits the changing and regenerating of the header information. An electrical/optical converter set 115 assists in the conversion for optical-modulating the regenerated header information. An edge traffic aggregator 116 includes an ingressor 116-1 for converting optical IP packets inputted from a lower IP router into optical data frames and an egressor 116-2 for converting the optical data frames into optical IP packets and transmitting the converted optical IP packets to the lower IP router.

Figure 3A:
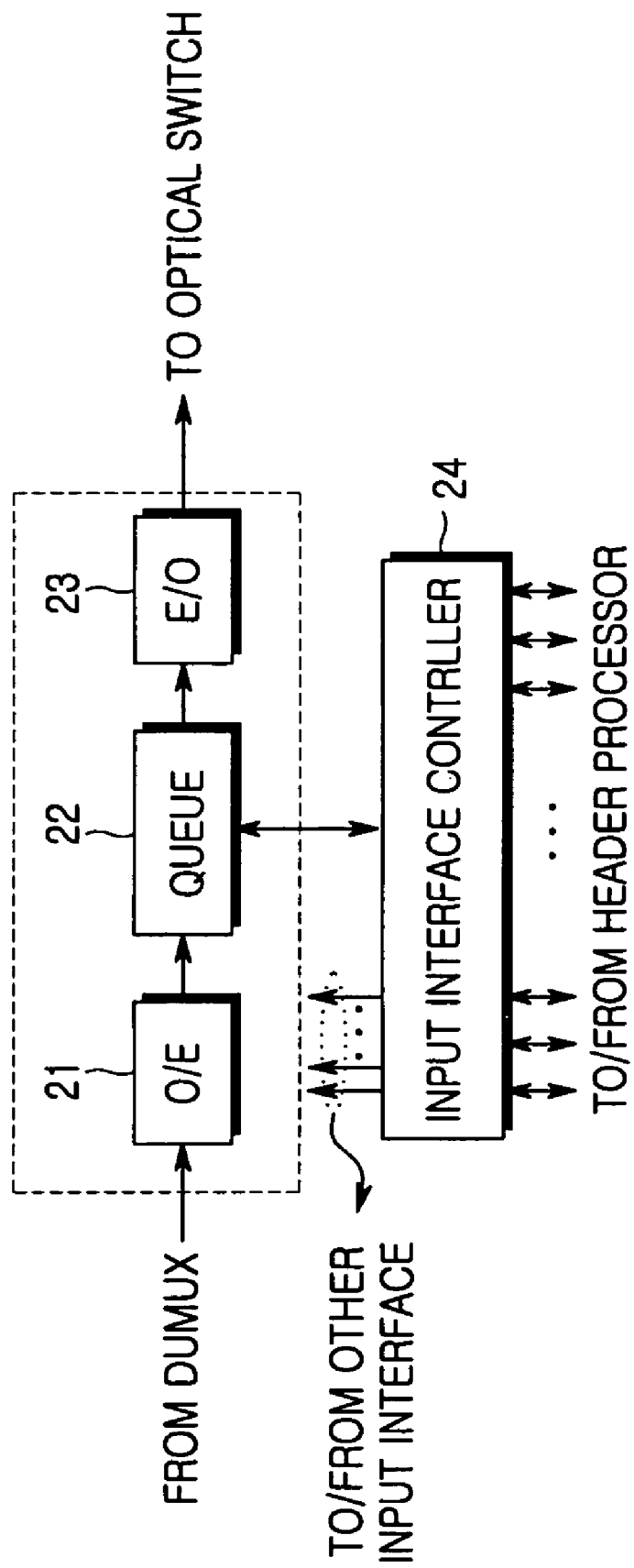
FIGS. 3A and 3B are detailed constructional views showing an input interface used in an high speed optical routing apparatus according to the present invention.
Figure 3B:
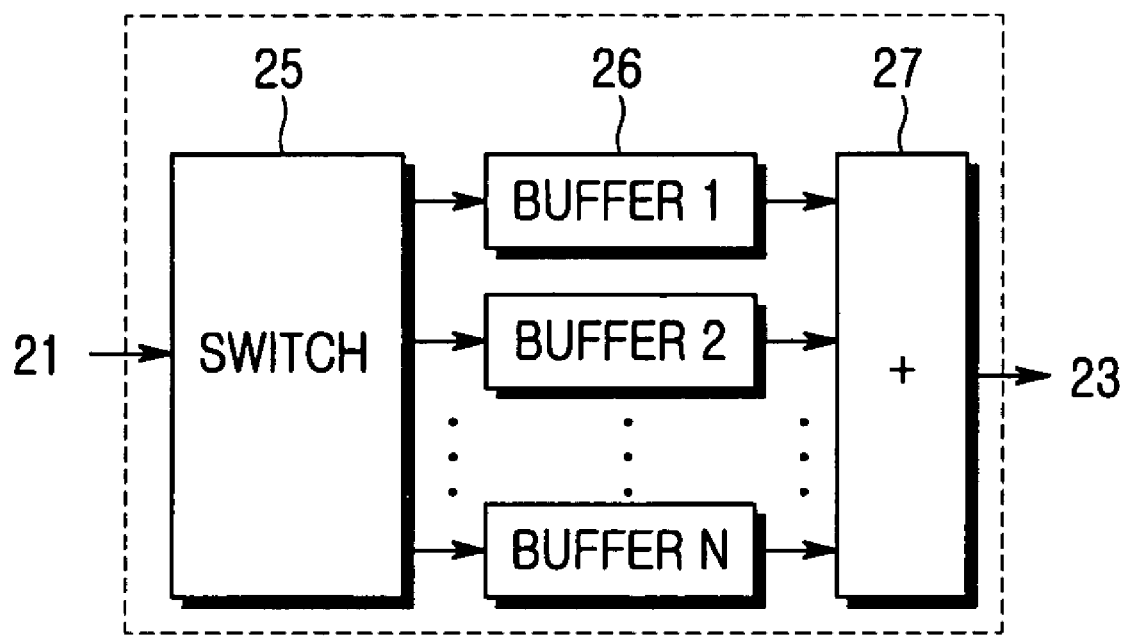

FIGS. 3A and 3B are detailed constructional views showing an input interface used in an high speed optical routing apparatus according to the present invention.

FIG. 3A shows a detailed construction of an input interface used in an high speed optical routing apparatus according to the present invention. Each input interface of the input interface sets 14-1 to 14-N are used in an high speed optical routing apparatus according to the present invention. Included is an optical/electrical converter 21 for receiving optical data frames from each of the DEMUXs 13-1 to 13-N and converting the received optical data frames into electrical signals. Queue 22 for stores the optical data frames in order to avoid conflict between the optical data frames before being sent to the optical switch 15, and an electrical/optical converter 23 for modulating and transmitting the electrical signals outputted from the queue 22.

FIG. 3B shows a detailed construction of queue 22 of an input interface used in an high speed optical routing apparatus according to an aspect of the present invention. The queue 22 is used to overcome the limitations of input buffering, and includes an electrical switch 25, multiple buffers 26 and a coupler 27. Further, all the queues 22 of each input interface of the input interface sets 14-1 to 14-N are controlled by an input interface controller 24.

Figure 4:
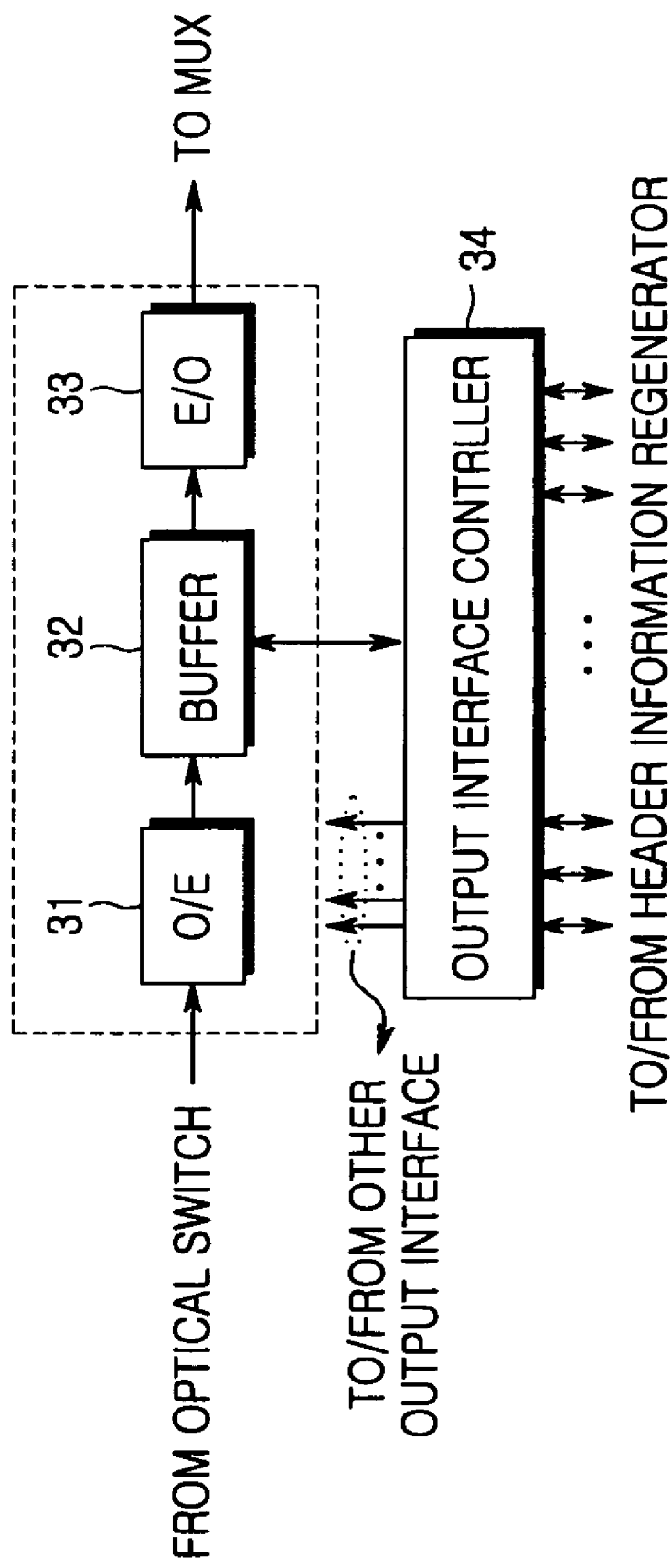
FIG. 4 is a detailed constructional view showing an output interface used in an high speed optical routing apparatus according to the present invention.

FIG. 4 shows a detailed construction of an output interface used in an high speed optical routing apparatus according to an aspect of the present invention.

As shown in FIG. 4, each output interface of the output interface sets 16-1 to 16-N includes an optical/electrical converter 31 that converts the optical data frames switched by the optical switch 15 into electrical signals, a buffer 32 provides temporary storage of the optical data frames that have been converted into electrical signals, and an electrical/optical converter 33 optically modulates and outputs the optical data frames received from the buffer 32. In particular, the buffer 32 is controlled by an output interface controller 34.

Figure 5:
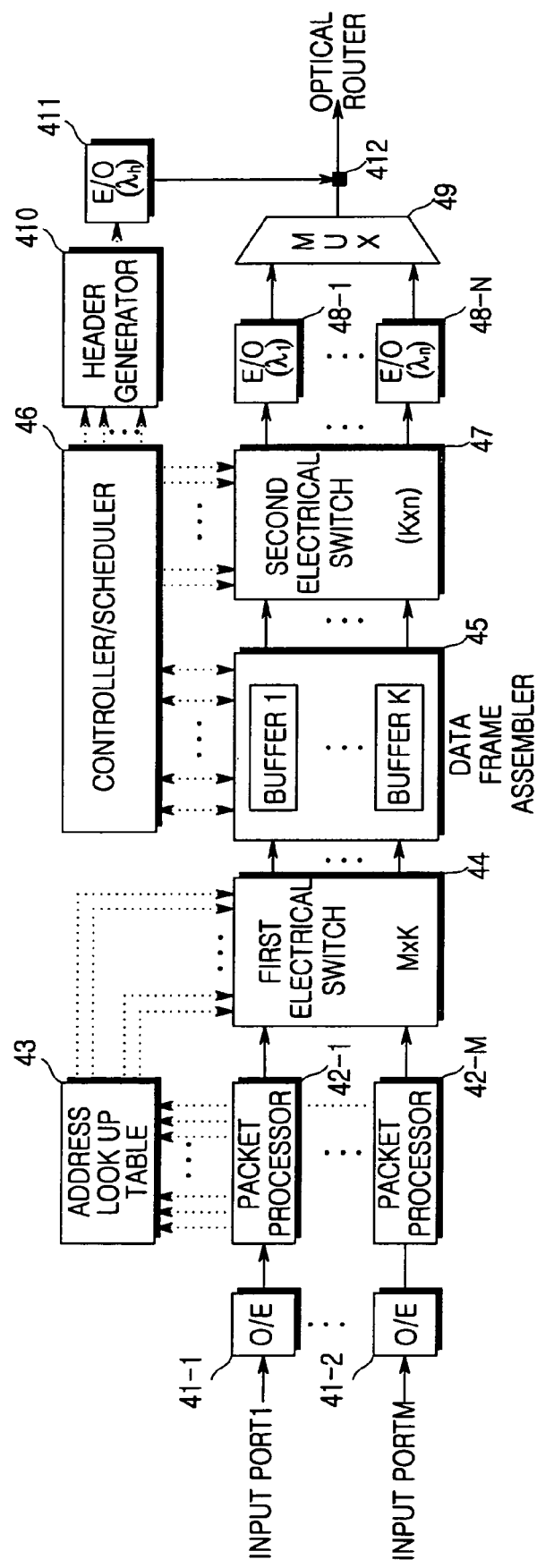
FIG. 5 is a detailed constructional view showing an ingressor of an edge traffic aggregator used in an high speed optical routing apparatus according to the present invention.

FIG. 5 shows a detailed construction of an ingressor of an edge traffic aggregator used in an high speed optical routing apparatus according to an aspect of the present invention.

As shown in FIG. 5, the ingressor 116-1 of the edge traffic aggregator 116 includes optical/electrical converters 41-1 to 41-M that receive optical IP packets inputted from the lower IP router and convert them into electrical signals. Packet processors 42-1 to 42-M perform a packet processing function that includes a forwarding function of the optical IP packets converted into electrical signals. Address lookup table 43 is used in conjunction with carrying out packet forwarding operation in the packet processors 42-1 to 42-M; The first electrical switch 44 provides switching of the packets outputted from the packet processors 42-1 to 42-M toward buffers of a data frame assembler 45 in order to generate data frames. The data frame assembler 45 is used for converting the packets switched toward the built-in buffers into data frames. The controller/scheduler 46 determines both a sequence and a wavelength to output the generated data frames, and a second electrical switch 47 switches the data frames according to the output sequence and wavelength. The header generator 410 generates headers, which include information on data frame destinations, etc., according to information of the controller/scheduler 46. The electrical/optical converters 48-1 to 48-N perform an electrical/optical conversion of the data frames outputted from the second electrical switch 47. The electrical/optical converter 411 performs electrical/optical conversion of the headers generated from the header generator 410. The MUX 49 wavelength-multiplexes the optical data frame signals, which are subject to electrical/optical conversion, into one output optical signal. The optical coupler 412 combines the electrical/optical converted headers with the optical data frames outputted to one optical signal by the wavelength-multiplexing.

Figure 6:
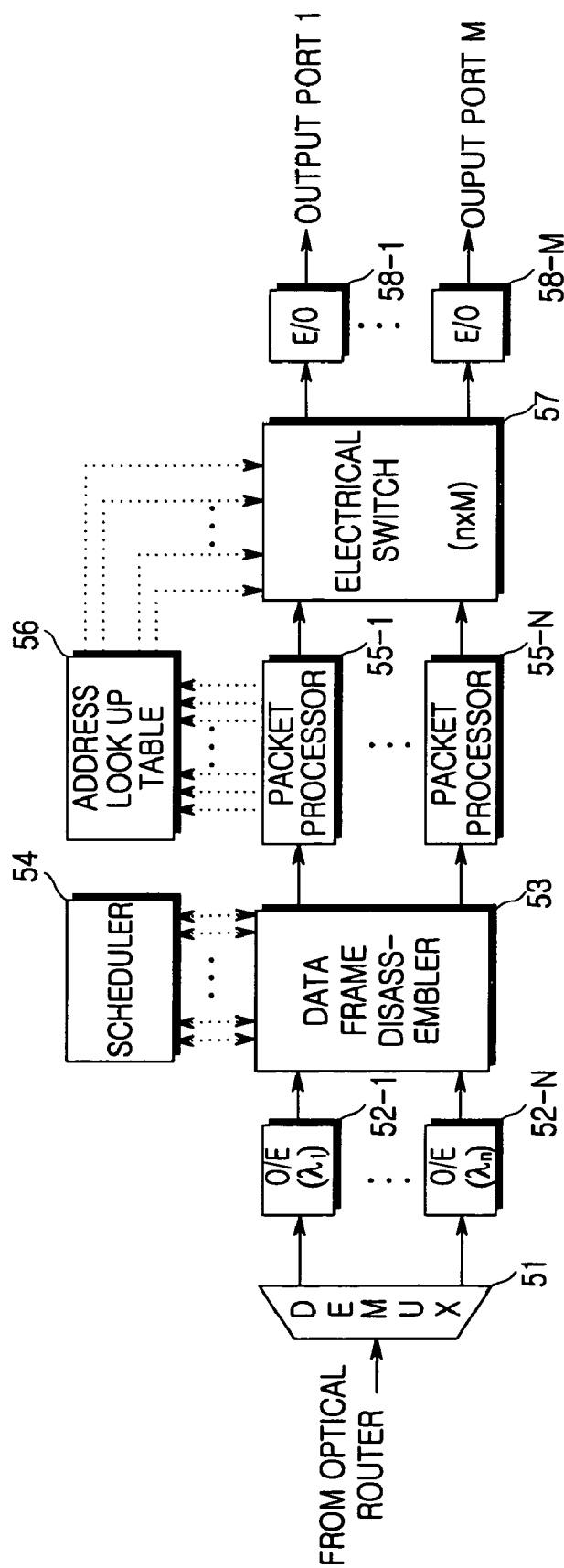
FIG. 6 is a detailed constructional view showing an egressor of an edge traffic aggregator used in an high speed optical routing apparatus according to the present invention.

FIG. 6 shows a detailed construction of an egressor of an edge traffic aggregator used in an high speed optical routing apparatus according to an aspect of the present invention.

As shown in FIG. 6, the egressor 116-2 of the edge traffic aggregator 116 includes a DEMUX 51 for demultiplexing wavelength-division-multiplexing optical signals dropped through a drop channel into optical data frames according to a wavelength. The optical/electrical converters 52-1 to 52-N convert the optical signals, which are demultiplexed into the wavelength-based optical data frames, into electrical signals. A data frame disassember 53 divides the wavelength-based optical data frames converted into electrical signals based on an IP packet unit. Scheduler 54 for controls an output sequence of the divided IP packets. Packet processors 55-1 to 55-N process the IP packets through a packet processing procedure including a forwarding procedure. Address lookup table 56 is used for seeking a destination address that each IP packet targets during forwarding of the packet processors 55-1 to 55-N. The electrical switch 57 for switches the packets outputted from the packet processors 55-1 to 55-N toward a destination router based on the address lookup table 56. Finally, the electrical/optical converters 58-1 to 58-M perform optical modulation of the switched packets to transmit them to the lower IP router.

Figure 7:
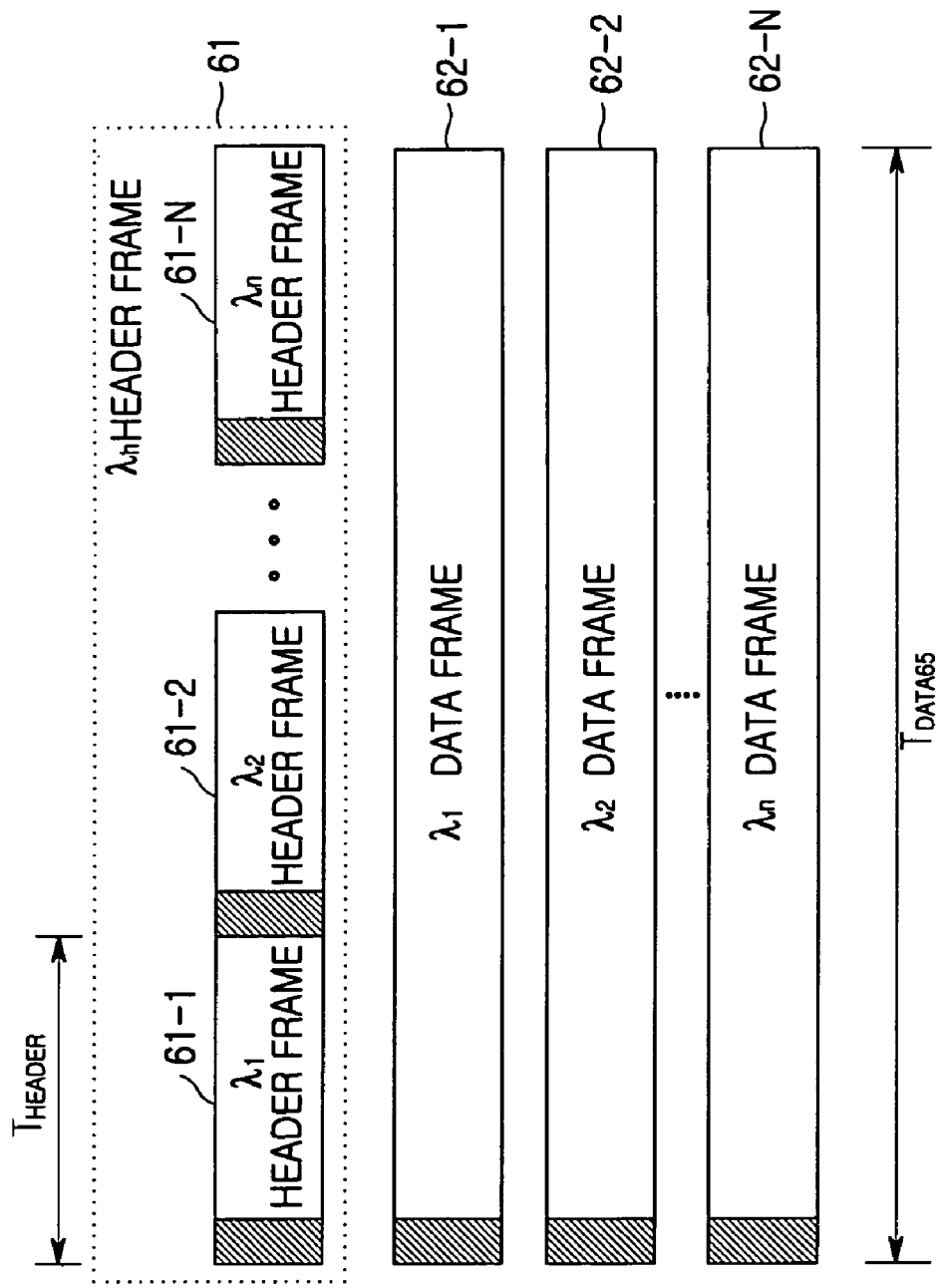
FIG. 7 shows a format of header and data frames, which are used in an high speed optical routing apparatus according to the present invention.

FIG. 7 shows a format of header and data frames, which are used in an high speed optical routing apparatus according to the present invention.

As shown in FIG. 7, a header frame 61 and data frames 62-1 to 62-N make use of different wavelengths from each other. That is, the header frame uses a wavelength of $\lambda_h$, whereas the data frame set uses wavelengths ranging from $\lambda_1$ to $\lambda_n$. In addition, the header frame and the data frame set are synchronized and transmitted, and have a time length equal to each other.

The header frame uses a low speed signal, while the data frame set uses a high speed signal. For example, the header frame has a speed of 1.25 Gb/s, while the data frame set has a speed of 10 Gb/s.

The header frame 61 are reclassified into n numeral header sub-frames, each of which includes one header. In other words, the header frame 61 is time-division-multiplexed with n numeral headers, i.e., a first header for a $\lambda_1$ data frame to an $n^{th}$ header for a $\lambda_n$ data frame.

At the front of each header sub-frame and data frame, a preamble is located to distinguish each start point.

A detailed description will be made below regarding an operation of the high speed optical routing apparatus including constructions of FIGS. 2 to 6 in accordance with the present invention with reference to FIGS. 2 to 7.

The header frame and the data frames shown in FIG. 7 are generated from the edge traffic aggregator. To describe an operation of the high speed optical routing apparatus according to an aspect of the present invention, operations of the ingressor and the egressor of the edge traffic aggregator are described first.

The IP packets transmitted from the lower IP router are mainly inputted at a wavelength of 1.3 mm, and are converted into electrical signals at the electrical/optical converters 41-1 to 41-M of the ingressor. The packets, which are converted into electrical signals, determine their own destination ports (i.e., output positions) and their own output sequences at the packet processors 42-1 to 42-M by performing a lookup of addresses at the address lookup table 43. The data frame assembler 45 in the ingressor is provided with buffers for as many of the destination addresses.

Therefore, the packets, of which destination ports and output sequences are determined at the packet processors 42-1 to 42-M, are switched toward the buffers of the data frame assembler 45 at the M×K first electrical switch 44 (here, M is the number of input signals, and K is the number of the data frames), in which the buffers correspond to the destination addresses. When each buffer of the data frame assembler 45 is filled with each packet as long as the length of the data frame, an output request signal is sent to the controller/scheduler 46.

On receiving the output request signal, the controller/scheduler 46 examines the output wavelength channels to check whether or not any one of the output wavelength channels is immediately available. As a result of checking, if an available wavelength channel is not present, the controller/scheduler 46 is on standby until any available wavelength channel appears in the buffers. However, if an available wavelength channel is present, the controller/scheduler 46 generates a control signal of the K×n second electrical switch (here, K is the number of the buffers of the data frame assembler, and n is the number of output optical channels), and the data frames filled within the buffers are switched to the electrical/optical converters 48-1 to 48-N having selected wavelength channels at the K×n electrical switch 47. The data fames are multiplexed at the MUX 49 after being optical-modulated at the electrical/optical converters 48-1 to 48-N. At the controller/scheduler 46, various information on the selected data frames, for example, an output wavelength, an output time and so forth are transmitted to the header generator 410. The header generator 410 generates headers including a destination address, etc. of each data frame on the basis of the information received from the controller/scheduler 46. The headers are allocated to the header sub-frames 61-1 to 61-N for wavelengths of the data frames to be outputted. In this manner, the headers corresponding to each wavelength are all generated and time-division-multiplexed.

After the time division multiplexing is completed, the header signals are modulated at the electrical/optical converter 411 having a wavelength of $\lambda_h$, and then combined with the wavelength-multiplexed optical data frame signals at the optical coupler 412 to be transmitted to the add port of the high speed optical routing apparatus according to the present invention. At this time, the optical data frames and the headers are synchronized and transmitted as shown in FIG. 7.

Meanwhile, among the optical data frames switched at the optical router, ones to be transmitted to the lower IP router are inputted into the egressor 116-2 of the edge traffic aggregator 116 through the drop port. The optical data frames inputted into the egressor 116-2 are demultiplexed at the DEMUX 51 and then converted into electrical signals at the optical/electrical converters 52-1 to 52-N. The data frames converted into electrical signals are divided into the original IP packet units at the data frame disassembler 53. The divided IP packets are endowed with output sequences at the scheduler 54, being subjected to forwarding using the address lookup table 56 in order to be transmitted to a destination IP router at the packet processors 55-1 to 55-N, and switched toward the destination IP router at the n×M electrical switch 57 (here, n is the number of input signals, and M is the number of output signals). The switched packets are optical-modulated at the electrical/optical converters 58-1 to 58-M and then transmitted to the destination IP router.

Taking a view of an operation of the high speed optical routing apparatus according to the present invention in consideration of the operations of the ingressor 116-1 and the egressor 116-2 of the edge traffic aggregator 116 as mentioned above, the wavelength-multiplexed optical frames and headers, all of which are outputted from the ingressor 116-1 of the edge traffic aggregator 116 and then inputted into the add port, as well as the optical data frames and header wavelengths with a value of $\lambda_h$ from among header signals, all of which are inputted into the other input ports 1 to N-1 of the high speed optical routing apparatus according to the present invention, are divided at the circulators 11-1 to 11-N and the optical fiber gratings 12-1 to 12-N of the high speed optical routing apparatus, and then transmitted to the optical switch controller 112. The signals having wavelengths from $\lambda_1$ to $\lambda_n$ are demultiplexed at the DEMUXs 13-1 to 13-N, and then transmitted to the input interface sets 14-1 to 14-N.

The optical data frames inputted into the input interface sets 14-1 to 14-N are converted into electrical signals at each optical/electrical converter 21, and then stored on each queue 22. These queues 22 are controlled by the input interface controller 111 connected with the header processor 110, and are operated as follows.

The header wavelengths with the value of $\lambda_h$ are converted into electrical signals at the optical/electrical converter set 19 on the input side of the optical router controller and then inputted into the header processor 110. The header processor 110 reads out information on a destination address, etc. within each header, and determines the sequence in which the corresponding data frame is to be outputted through a scheduling procedure. The corresponding data frame is stored on each queue 22 until the scheduling procedure is completed at the header processor 110. In this case, to solve an HOL (Head Of Line) blocking problem as an input buffering problem, each queue 22 includes multiple buffers 26. When the scheduling of the corresponding data frame is completed, a packet processor 110 transmits a data frame output allowance signal to the input interface controllers 111 and 24. The input interface controllers 111 and 24 control each queue 22 to cause the data frames stored on each queue 22 to be outputted, and then performs optical modulation of the data frames at each electrical/optical converter 23 to transmit them to the optical switch 15. Here, each electrical/optical converter 23 may make use of an inexpensive short-reach device. The head processor 110 transmits a control signal to the optical switch controller 112 on the basis of the results of the data frame scheduling, and controls the optical switch 15 at the optical switch controller 112 to switch the optical data frames, which are transmitted to the optical switch 15, toward a destination output at a high speed. Further, the header processor 110 transmits information for changing and regenerating the header information to the header regenerator 113.

The optical data frames switched at the optical switch 15 are inputted into the output interface sets 16-1 to 16-N. The optical data frames inputted into the output interface sets 16-1 to 16-N are converted into electrical signals at each optical/electrical converter 31 again, and stored on each buffer 32. In this process, the optical data frames may be subjected to 3R regeneration or the like. Because no header is contained in the data frames stored on each buffer, they can not be outputted until generation of a new header is completed. This operation may be described as follows. The header regenerator 113, which have received a header change signal transmitted from the header processor 110, corrects and regenerates the headers to form a header frame 61 as shown in FIG. 7, and then transmits a header signal, in which the header frame 61 is contained, to the electrical/optical converter set 115.

At this time, the header regenerator 113 transmits a data frame output allowance signal to the output interface controllers 114 and 34. The output interface controllers 114 and 34 control each buffer 32 to cause the data frames stored on each buffer to be outputted and optical-modulated at each electrical/optical converter 33. The signals of the modulated optical data frames are wavelength-multiplexed at the MUXs 17-1 to 17-(N-1) and then combined with the headers, which are optical-modulated at the electrical/optical converter set 115, at the optical couplers 18-1 to 18-(N-1). The signals are outputted to the next optical router.

Meanwhile, among the data frames switched at the optical switch 15, ones to be transmitted to the lower IP router pass through the output interface set 16-N without reinsertion of the header to be dropped toward the egressor 116-2 of the edge traffic aggregator 116.

As mentioned above, the present invention provides an optical router, in which data traffic, such as an IP packet, an Ethernet frame and so forth, are switched in an optical frame unit at a high speed. In particular, there are effects of solving price and speed restrictions of a tunable wavelength converter as well as solving a problem of a fiber delay line buffer, all of which the conventional all-optical router approaching method has incurred, as well as facilitating monitoring of a signal performance and signal regeneration.

Further, the present invention brings many advantages, including that it can solve problems of operation speed and expansibility of an electrical switch by using a high speed optical switch, unlike an electrical router approaching method.

The present invention can also overcome restrictions on forwarding and switching speed of the conventional IP router by performing switching in an optical frame unit of a constant length. Additionally, the present invention can greatly reduce the number of equipment required by a node by having a capacity of Tb/s or more as a monolithic structure.

While the invention has been shown and described with reference to certain preferred embodiments thereof, it will be understood by one skilled in the art that various modifications may be made therein without departing from the spirit and scope of the invention as defined by the appended claims.

What is claimed is:

1. A high speed optical routing apparatus having an optical router for routing optical data, comprising:
    means for receiving input optical signals through a plurality of input puts and an add port, wherein said input optical signals having a plurality of data wavelengths and at least a first header wavelength containing header information on respective wavelengths of said plurality of data wavelengths;
    an extraction unit for extracting said first header wavelength from the input optical signals;
    a demultiplexer for demultiplexing the plurality of data wavelengths according to wavelengths of the optical signals;
    a converter/reconverter unit for converting the demultiplexed data wavelengths into divided electrical signals, and then for reconverting the divided electrical signals into reconverted optical signals; and
    a switch for switching the reconverted optical signals according to the header information, subsequent to their reconversion to electrical signals,
    wherein a capacity of the apparatus is substantially in Tb/s (terra-bytes) and said apparatus is arranged in a monolithic structure, without requiring a plurality of routers and at least one tunable wavelength converters (TWC).

2. A high speed optical routing apparatus including a plurality of input and output ports, an add port for adding data received from a lower IP router, and a drop port for dropping processed data toward the lower IP router, the high speed optical routing apparatus comprising:
    a header wavelength dividing section for extracting header wavelength signals from among input optical signals inputted through the input ports and the add port, the header wavelength signals containing header information on data wavelength signals contained in the input optical signals;
    an optical signal inputting section that demultiplexes optical signals comprising the data wavelength signals according to wavelengths of the optical signals and for dividing and inputting the wavelength-based demultiplexed data wavelength signals according to frames of the demultiplexed optical signals, the data wavelength signals being divided with the header wavelength signals through the header wavelength dividing section;
    an optical switch for switching the frame-based divided optical signals outputted from the optical signal inputting section;
    an optical signal outputting section for combining the frame-based divided optical signals switched and outputted at the optical switch, and for wavelength-mutiplexing the combined optical signals into one output optical signal and for outputting the multiplexed output optical signal;

a controlling section for controlling the optical signal inputting section, the optical switch and the optical signal outputting section;

a header managing section for receiving the header wavelength signals divided at the header wavelength dividing section to transmit the header information contained in the header wavelength signals to the controlling section so as to control the optical signal inputting section and the optical switch through the controlling section, and for generating new header information on the multiplexed optical signal outputted through the optical signal outputting section to transmit the new header information to a header wavelength coupling section;

the header wavelength coupling section for combining the output optical signal outputted through the optical signal outputting section with a corresponding wavelength signal containing the new header information generated at the header managing section; and an edge traffic aggregator for converting adding IP packets inputted from the lower IP router into adding optical frames and transmitting the adding optical frames to the add port, and for converting dropping optical frames from the drop port into dropping IP packets for inputting the dropping optical frames into the lower IP router and transmitting the dropping IP packets to the lower IP router.

3. A high speed optical routing apparatus according to claim 2, wherein the header wavelength signals containing header information are formed by time-division-multiplexing header information on wavelength-based data frames contained in the input optical signals inputted through the input ports, with respect to one wavelength different from wavelengths for the wavelength-based data frames.

4. A high speed optical routing apparatus according to claim 2, wherein the header wavelength dividing section comprises:

at least one optical filter for reflecting and transmitting the header wavelength signals from among the input optical signals, and for transmitting remaining optical signals excluding the header wavelength signals to the optical signal inputting section; and at least one optical circulator for receiving the input optical signals inputted through the input ports to transmit the received input optical signals to the optical filter, and for transmitting the header wavelength signals, which are transmitted from the optical filter, to the header managing section.

5. A high speed optical routing apparatus according to claim 2, wherein the optical signal inputting section comprises:

at least one wavelength division demultiplexer for receiving the optical signals, from which the header wavelength signals are divided through the header wavelength dividing section, to divide the received optical signals according to a wavelength;

at least one optical/electrical converter for optical/electrical converting the respective wavelength-based divided optical signals outputted from the wavelength division demultiplexer into electrical signals;

a temporary storing section for dividing, storing and outputting the optical/electrical converted electrical signals according to a data frame under the control of the controlling section; and at least one electrical/optical converter for converting the data frames outputted from the temporary storing section into optical signals, and for outputting the converted optical signals to the optical switch.

6. A high speed optical routing apparatus according to claim 2, wherein the optical outputting section comprises:

at least one optical/electrical converter for receiving optical frame signals outputted by switching of the optical to optical/electrical convert the received optical frame signals into electrical signals;

a temporary storing section for dividing, storing and outputting the optical/electrical converted electrical signals according to a data frame under the control of the controlling section;

at least one electrical/optical converter for converting the data frames outputted from the temporary storing section into optical signals and for outputting the converted optical signals to the optical switch; and at least one wavelength division multiplexer for multiplexing the optical signals outputted through the electrical/optical converter into one output signal and for output the multiplexed output signal.

7. A high speed optical routing apparatus according to claim 2, wherein the header managing section comprises:

at least one optical/electrical converter for receiving and optical/electrical converting the header wavelength signals divided at the header wavelength dividing section;

a header processor for recognizing header information from the optical/electrical converted header wavelength signals to transmit information for controlling the optical signal inputting section and the optical switch to the controlling section;

a header information regenerator for generating new header information on optical signals to be outputted through the optical signal outputting section, and for causing the controlling section to transmit output control signal for the optical signal outputting section; and at least one electrical/optical converter for electrical/optical converting the generated new header information.

8. A high speed optical routing apparatus according to claim 2, wherein the controlling section controls the optical signal inputting section, the optical switch and the optical signal outputting section using the header information transmitted through the header managing section.

9. A high speed optical routing apparatus according to claim 2, wherein the edge traffic aggregator comprises:

an ingressor for converting adding IP packets inputted from the lower IP router into adding optical frames and for transmitting the adding optical frames to the add port;

an egressor for converting dropping optical frames from the drop port into dropping optical IP packets and for transmitting the dropping IP packets to the lower IP router.

10. A high speed optical routing apparatus according to claim 9, wherein the ingressor comprises:

at least one first optical/electrical converter for receiving the adding IP packets inputted from the lower IP router to convert the received IP packets into electrical signals;

at least one packet processor for performing packet processing operation for the IP packets converted into electrical signals;

an address lookup table for performing packet forwarding operation during the packet processing operation at the packet processor;

a first electrical switch for switching the IP packets outputted from the packet processor toward a first preset number of buffers of a data frame assembler based on the address lookup table;

the data frame assembler having the first preset number of buffers therein, for generating the IP packets switched toward the built-in buffers into data frames;

a controller/scheduler for determining an output sequence and an output wavelength of the data frames generated from the data frame assembler;

a second electrical switch for switching the data frames, in which the output sequence and wavelength are determined at the controller/scheduler, to be matched to corresponding sequence and wavelength;

a header generator for generating headers including information on a destination, of the generated data frames according to information of the controller/scheduler;

at least one first electrical/optical converter for electrical/optical converting the data frames outputted from the second electrical switch;

a second electrical/optical converter for electrical/optical converting the headers generated from the header generator;

a wavelength division multipixer for multiplexing signals of the optical data frames electrical/optical converted by the first electrical/optical converter into one optical signal to outputting the multiplexed optical signal; and an optical coupler for combining the headers electrical/optical converted by the second electrical/optical converter with the multiplexed and outputted optical signals, and for outputting the combined results to the add port.

11. A high speed optical routing apparatus according to claim 10, wherein the data frame assembler is designed to classify the packets switched by the first electrical switch according to a destination, to store the classified packets on the first preset number of buffers, to process the stored packets into data frames according to each buffer when a predetermined volume of data are accumulated, to transmit the buffer-based data volume, of the data frame assembler to the controller/scheduler, and to cause the controller/scheduler to determine the output sequence and wavelength of the data frames.

12. A high speed optical routing apparatus according to claim 9, wherein the egressor comprises:

a wavelength division demultiplexer for demultiplexing wavelength division multiplexing optical data frames dropped through the drop port;

at least one optical/electrical converter for converting the demultiplexed optical data frames into electrical signals;

a data frame disassembler for dividing the data frames converted into electrical signals in an IP packet unit;

a scheduler for controlling an output sequence of the divided IP packets;

at least one packet processor for performing packet processing operation for the divided IP packets;

an address lookup table for performing packet forwarding operation during the packet processing operation at the packet processor;

an electrical switch for switching the packets processed by the packet processor based on the address lookup table; and at least one electrical/optical converter for optical modulating the switched packets to output the modulated packets to the lower IP router.

13. A high speed optical routing method, in which an optical router includes a plurality of input and output ports, one add port for adding data received from a lower IP router, and one drop port for dropping processed data toward the lower IP router, the high speed optical routing method comprising the steps of:

a) receiving input optical signals through the input ports and the add port, the input optical signals having a plurality of data wavelengths and at least one first header wavelength containing header information on the respective data wavelengths;

b) extracting the first header wavelength from the input optical signals;

c) demultiplexing the plurality of data wavelengths according to wavelengths of the optical signals, converting the demultiplexed data wavelengths into electrical signals, and dividing the converted electrical signals according to frames of the demultiplexed optical signals to reconvert the divided electrical signals into optical signals;

d) switching the optical signals of step c) according to the header information contained in the first header wavelength;

e) converting the optical signals switched in step d) into electrical signals, combining the converted electrical signals according to a frame, reconverting the combined electrical signals into optical signals, and multiplexing the reconverted optical signals according to a wavelength to generate one optical signal;

f) generating wavelength-based header information for the optical signals generated in step e) into at least one second header wavelength, combining the generated second header wavelength with the optical signals generated in step e), and transmitting the combined results to a next node through the output ports; and g) transmitting the optical signals generated in step e) to at least one lower interface through the drop port.

14. A high speed optical routing method according to claim 13, further comprising, after step g), an step of converting packets inputted from the lower interface into a predetermined length of optical data wavelengths according to a destination address, combining the converted optical data wavelengths with the first header wavelength and transmitting the combined results to the add port.

15. A high speed optical routing method according to claim 14, wherein the first header wavelength or the second header wavelength comprises at least one wavelength divided from the data wavelengths.

16. A high speed optical routing method according to claim 14, wherein the first header wavelength or the second header wavelength includes sub-frames, which are uniformly divided from a frame having a size equal to each data frame contained in the data wavelengths as many as the number of the header information contained in the first or second header wavelength.

17. A high speed optical routing method according to claim 13, wherein the first header wavelength or the second header wavelength comprises at least one wavelength divided from the data wavelengths.

18. A high speed optical routing method according to claim 13, wherein the first header wavelength or the second header wavelength includes sub-frames, which are uniformly divided from a frame having a size equal to each data frame contained in the data wavelengths as many as the number of the header information contained in the first or second header wavelength.

* * * * *